(12) United States Patent
Gebert et al.

(10) Patent No.: US 10,883,598 B2
(45) Date of Patent: Jan. 5, 2021

(54) PARKING LOCK MODULE FOR ACTUATING A PARKING LOCK IN A MOTOR VEHICLE

(71) Applicant: FTE automotive GmbH, Ebern (DE)

(72) Inventors: Stefan Gebert, Ebern (DE); Steve Selch, Ebern (DE); Andreas Schwipp, Ebern (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 16/507,088

(22) Filed: Jul. 10, 2019

(65) Prior Publication Data
US 2020/0040993 A1 Feb. 6, 2020

(30) Foreign Application Priority Data
Aug. 3, 2018 (DE) .......................... 10 2018 006 097

(51) Int. Cl.
*F16H 63/34* (2006.01)
*F15B 15/14* (2006.01)

(52) U.S. Cl.
CPC ......... *F16H 63/3483* (2013.01); *F15B 15/14* (2013.01)

(58) Field of Classification Search
None
See application file for complete search history.

(56) References Cited

U.S. PATENT DOCUMENTS

| 8,978,862 B2 * | 3/2015 | Heuver ................. F16D 63/006 |
| | | 192/219.5 |
| 2005/0205385 A1 * | 9/2005 | Reed ................... F16H 63/3416 |
| | | 192/219.5 |
| 2010/0108460 A1 * | 5/2010 | Nakamura .......... F16H 63/3416 |
| | | 192/219.5 |

(Continued)

FOREIGN PATENT DOCUMENTS

| DE | 10 2011 105 068 A1 | 7/2012 |
| DE | 10 2015 008 709 A1 | 1/2016 |

(Continued)

OTHER PUBLICATIONS

Amendment to claim 1 of EP20190189216.5 (dated Jul. 21, 2020) (Year: 2020).*

(Continued)

*Primary Examiner* — Colby M Hansen
(74) *Attorney, Agent, or Firm* — Oblon, McClelland, Maier & Neustadt, L.L.P.

(57) ABSTRACT

A parking lock module has a housing, in which, for the actuation of a parking lock, a positioning member movable from a locking position into an unlocking position and vice versa. The positioning member is selectively fixable relative to the housing with an arresting device, which has a detent contour fixed to the positioning member and has a detent element on the housing. The detent element is movable from an arresting position into a release position, and vice versa. The detent element is preloaded into the arresting position with a spring and is actively movable into the release (Continued)

position with a fluidic actuator with a pressurizable effective surface. The detent element can be formed as a piston guided displaceably along a feed axis and which forms the pressurizable effective surface of the fluidic actuator.

13 Claims, 5 Drawing Sheets

(56) References Cited

U.S. PATENT DOCUMENTS

| | | | |
|---|---|---|---|
| 2012/0160631 A1* | 6/2012 | Bauer | F16H 63/3483 192/219.5 |
| 2014/0110216 A1 | 4/2014 | Pollack | |
| 2016/0208916 A1 | 7/2016 | Kokubu et al. | |
| 2018/0119816 A1 | 5/2018 | Gollmer et al. | |
| 2018/0154881 A1 | 6/2018 | Heubner et al. | |

FOREIGN PATENT DOCUMENTS

| | | |
|---|---|---|
| DE | 10 2015 214 037 A1 | 1/2017 |
| DE | 10 2016 011 148 A1 | 3/2017 |
| EP | 3 333 463 A1 | 6/2018 |
| WO | WO 2016087018 A2 | 6/2016 |

OTHER PUBLICATIONS

Extended European Search Report dated Dec. 2, 2019 in Patent Application No. 19189216.5, 10 pages.

\* cited by examiner

PARKING LOCK MODULE FOR ACTUATING A PARKING LOCK IN A MOTOR VEHICLE

TECHNICAL FIELD

The invention relates to a parking lock module for actuating a parking lock in a motor vehicle, as per the preamble of patent claim 1. In particular, the invention relates to a parking lock module such as has recently found widespread use in the automotive industry in motor vehicles with hybrid transmissions and modern transmissions with an automatic nature (automated manual transmissions).

PRIOR ART

Parking locks are required in particular when a self-locking action of the drive (engine) cannot be utilized to hold the motor vehicle stationary. Locking of the drive train is then generally realized by means of a parking lock wheel which is arranged rotationally conjointly on an output shaft of the transmission and which has a toothing and which, by means of a parking lock pawl mounted pivotably on a parallel axle, can be locked in form-fitting fashion at the toothing, wherein the parking lock pawl must be pivoted counter to the force of a restoring spring which preloads the parking lock pawl away from the parking lock wheel into an unlocked position.

For this purpose, aside from electrically actuated parking lock actuators, use may also be made of electrohydraulically or hydraulically actuated parking lock actuators, which serve for generating a linear movement by means of which an actuating element, for example in the form of a cam or of a cone, can be moved against the parking lock pawl in order to pivot the latter. To ensure that the parking lock prevents the motor vehicle from rolling away even if the parking lock pawl, during the actuation process, abuts against a tooth of the parking lock wheel without engaging in form-fitting fashion with the toothing, it is furthermore possible for an energy store (advancing spring) to be provided on the actuating element, which energy store, in the event of the motor vehicle rolling, advances the parking lock pawl via the actuating element such that said parking lock pawl enters into engagement with the toothing of the parking lock wheel. Furthermore, in general, it must be ensured that the actuating element, in its respective actuation position relative to the parking lock pawl—holding the parking lock pawl that has been pivoted into engagement with the parking lock wheel, or releasing the parking lock pawl—is arrested without application of energy (electrical current or pressure), and an emergency actuation is possible which permits an engagement of the parking lock in the event of a failure of the actuator.

In the prior art, there is no lack of proposals for realizing these functions in a manner integrated in a parking lock module for actuating a parking lock in a motor vehicle. One such parking lock module is disclosed for example by the document DE 10 2015 008 709 A1, which forms the preamble of Patent Claim 1. According to this prior art, the parking lock module has pressure chamber housing in which a positioning member in the form of a piston element, as a constituent part of an actuating mechanism, is accommodated. An actuating member in the form of a shift rod is articulated on the piston element. The piston element, which is longitudinally displaceable along a displacement axis of the pressure chamber housing, is, in a parking lock engagement direction, preloaded by means of a piston spring with a spring force into a locking position, in which said piston element can be selectively fixed relative to the pressure chamber housing by means of a detent unit. Furthermore, the piston element can be subjected to pressure loading in a parking lock disengagement direction, which is opposite to the parking lock engagement direction, by means of a hydraulic pressure chamber in the pressure chamber housing in order, when the detent unit is released, to assume an unlocking position counter to the spring force of the piston spring, in which unlocking position the piston element is in turn selectively fixable relative to the pressure chamber housing by means of the detent unit.

Here, an actuating cone is arranged in axially displaceable fashion on the shift rod, more specifically on that end thereof which is averted from the piston element, which actuating cone is, by means of a spring element, preloaded relative to the shift rod in the parking lock engagement direction against a stop provided on the shift rod. In the event of a movement of the piston element into the unlocking position, the actuating cone can thus be moved by means of the stop in the parking lock disengagement direction. The actuating cone has an actuating bevel which can be placed in contact with a cone guide element which is fixed with respect to the pressure chamber housing and which is in the form of a metallic support plate, such that, in the event of a longitudinal movement, effected by means of the piston element, of the shift rod in the parking lock engagement direction, the actuating bevel is supported on an alignment bevel of the support plate and, here, deflecting the shift rod relative to the piston element, causes a movement of the actuating cone in a transverse direction in order to actuate the parking lock, that is to say the locking element (parking lock pawl) thereof.

In the case of this prior art (see FIGS. 3 and 4 of document DE 10 2015 008 709 A1), the abovementioned detent unit comprises, as detent element, firstly a detent lever which is accommodated in a housing cutout formed transversely with respect to the displacement axis of the piston element in the pressure chamber housing, and which, there, is pivotable about a pivot axis which runs parallel to the displacement axis of the piston element. In order to fix the piston element in its locking position or its unlocking position relative to the pressure chamber housing, the detent lever may be placed in positive locking engagement with a detent contour provided on the piston element (locking state).

The detent lever is switchable passively into its locking state and actively into its unlocking state, in which it is out of engagement with the detent contour on the piston element. For the (passive) setting of the locking state, the detent unit has a restoring spring which engages, with a spacing to the pivot axis, on a projection of the detent lever in order to pivot the detent lever into, and hold it in, its locking state.

By contrast, for the (active) setting of the unlocking state, the known detent unit has an actuator arrangement which serves for pivoting the detent lever counter to a spring force of the restoring spring into its unlocking state. Said actuator arrangement is of redundant design and comprises a hydraulic actuator and an electromagnetic actuator, which can individually or jointly pivot the detent lever into its unlocking state and thereby enable the displacement of the piston element. The hydraulic actuator has a small cylindrical piston which is hydraulically pressurizable at a circular effective surface via a (further) pressure chamber formed in the pressure chamber housing. The small piston engages on an extension of the detent lever, which extension is formed on the detent lever on a side situated opposite the projection for the restoring spring. By contrast, the electromagnetic actuator has a solenoid which is flange-mounted on the pressure chamber housing and which has an armature which has a pin-like end. The pin-like end is displaceable along a feed axis which intersects the displacement axis of the piston element, and said pin-like end engages on an arm of the detent lever, which arm is formed on the detent lever between the projection for the restoring spring and the extension for the engagement of the hydraulic actuator.

In the case of this prior art, it is ultimately possible for the respective position of the piston element relative to the pressure chamber housing to be acquired by means of a sensor arrangement which has a travel sensor positionally fixed relative to the pressure chamber housing and has, outside the pressure chamber housing, a permanent magnet which is coupled axially fixedly to the piston element by means of a magnet holder in order to follow a movement of the piston element in a manner acquirable by means of the travel sensor. An actuation state of the parking lock module can thus be acquired.

A disadvantage of this prior art can be seen in particular in the fact that the design of the detent unit with a multiplicity of parts, and the installation thereof in and/or on the parking module, is associated with considerable outlay, which is undesirable in the context of mass production. Furthermore, the detent unit of the known parking lock module requires a relatively large structural space, which is to be attributed in particular to the fact that the detent lever, in order to provide sufficiently large lever arms and stop surfaces, itself takes up a relatively large amount of space, and the restoring spring, the electromagnetic actuator and the hydraulic actuator engage on the detent lever at points which are spaced apart from one another to a correspondingly great extent. The installation space available for the parking lock module on/in the transmission housing is however generally very constricted.

PROBLEM

The problem addressed by the invention is that of providing a parking lock module of the simplest possible design for actuating a parking lock in a motor vehicle, which parking lock module avoids the above disadvantages and has in particular a smaller structural space requirement in relation to the discussed prior art.

PRESENTATION OF THE INVENTION

Said problem is solved by means of a parking lock module for actuating a parking lock in a motor vehicle having the features of Patent Claim 1. The subclaims relate to advantageous embodiments of the invention.

In the case of a parking lock module for actuating a parking lock in a motor vehicle, which parking lock module has a housing, in which a positioning member for the actuation of the parking lock is accommodated in longitudinally displaceable fashion, which positioning member is movable from a locking position into an unlocking position and vice versa and is selectively fixable relative to the housing by means of an arresting device, which arresting device has a detent contour fixed to the positioning member and has a detent element on the housing, which detent element is movable from an arresting position, in which it is in engagement with the detent contour, into a release position, in which it releases the detent contour, and vice versa, wherein the detent element is preloaded into the arresting position by means of a spring and is movable, counter to the preload of the spring, into the release position by means of at least one fluidic actuator with a pressurizable effective surface, according to the invention the detent element is formed as a piston which is guided displaceably along a feed axis and which forms the pressurizable effective surface of the fluidic actuator.

By virtue of the fact that the detent element itself forms the piston with the effective surface of the fluidic actuator, by means of the pressurization of which the detent element is displaceable from its arresting position into its release position counter to the preload of the spring, it is firstly the case, in relation to the prior art discussed in the introduction, that components on the arresting device are eliminated, specifically in particular the small cylindrical piston which is separate there from the detent element (detent lever).

In other words, according to the invention, different functions (arresting of the positioning member by engagement with the detent contour, movement by pressurization for the release of the detent contour) are realized with only one component, specifically the piston-like detent element.

Since it is furthermore the case according to the invention that the detent element is guided displaceably along the feed axis, that is to say is movable linearly and in alignment with the effective surface of the fluidic actuator, the voluminous and cumbersome diversion of forces via the detent lever and the lever arms thereof, as is known from the prior art, is eliminated entirely. This applies correspondingly to the outlay which, in the prior art, is involved with the design and installation of the arresting device, which arises there in particular owing to the cutout, which runs transversely with respect to the positioning member, for receiving the detent lever in or on the housing of the parking lock module, the required pivotable mounting of the detent lever in said cutout, and the arrangement of the small piston spaced apart therefrom in the housing. In comparison with this, the guidance and hydraulic activation of the detent element according to the invention is considerably simpler and is less expensive to produce and to install.

According to the invention, the elimination of components and the guidance along one axis results overall in a considerably smaller structural space requirement for the arresting device and thus for the parking lock module as a whole. Here, owing to the arrangement of the pressurizable effective surface of the fluidic actuator on the piston-like detent element which is guided displaceably along the feed axis, an advantageously direct introduction of force for eliminating the arresting action between detent element and detent contour along only one axis is realized in a very compact structural form.

The feed axis of the detent element of the arresting device advantageously extends substantially transversely with respect to a displacement axis of the positioning member along which the positioning member is longitudinally displaceable in the housing of the parking lock module. The feed axis may duly also run at some other angle, that is to say an angle which deviates from approximately 90°, with respect to the displacement axis of the positioning member, though this is less preferred with regard to the most uniform possible force application of the arresting device independently of the locking position and unlocking position of the positioning member.

For the detent element, it is basically possible for a dedicated (sub-)housing to be provided which is flange-mounted in modular fashion on the housing of the parking lock module. By contrast, it is however preferable if the detent element is guided in a cutout of the housing of the parking lock module, which involves less outlay and a smaller structural space requirement in relation to the alternative above. Furthermore, in this way, the geometrical assignment of the detent element to the positioning member in the housing of the parking lock module is particularly simple.

The detent element may in this case basically be guided directly in the cutout of the housing. In a preferred embodiment, the detent element is however guided with the aid of a guide sleeve in the cutout of the housing, which is expedient in particular in the case of the housing being formed from a plastics material, in order to ensure high local stability with little wear.

The detent element and the associated cutout in the housing may furthermore basically have any desired complementary geometries which ensure the axial guidance of the detent element in the cutout. With regard to the simplest possible production and the greatest possible ease of movement in the guidance, however, it is preferable if the detent element and the cutout of the housing are of rotationally symmetrical form about the feed axis.

An embodiment of the parking lock module is furthermore particularly preferable in which the detent element is formed as a stepped piston and delimits, together with the cutout of the housing, an annular pressure chamber via which the effective surface of the fluidic actuator is pressurizable. In this way, in relation to the prior art discussed in the introduction, it is in particular the case that components on the arresting device are eliminated, specifically the small cylindrical piston which is separate from the detent element (detent lever) there.

Here, it is possible, though not imperative, for the detent element to be equipped, axially in the region of the annular pressure chamber, with a depression which runs around the feed axis. Said depression advantageously serves, without taking up more structural space, for an improved flow around the stepped piston, and/or a faster and more uniform filling of the annular pressure chamber and thus an improved pressure distribution at the pressurizable effective surface of the fluidic actuator.

In a preferred embodiment, the annular pressure chamber may furthermore be sealed off by means of a seal arrangement which, as viewed along the feed axis, has in each case one sealing element to both sides of the annular pressure chamber. Here, the sealing elements may be arranged so as to be fixed with respect to the detent element or fixed with respect to the housing. Depending on the use and position of the parking lock module in the vehicle, it is however also conceivable for no sealing elements to be used between the detent element and the housing, and for leakage from the annular pressure chamber to basically be permitted, or else for sealing of the fluidic actuator to the outside to be ensured at some other location on the arresting device.

The detent element may advantageously furthermore have a pin-like end which can be placed in engagement with the detent contour. The detent element can thus easily itself form a stop surface for defining the arresting position of the detent element. Furthermore, the pin-like end of the detent element for the engagement with the detent contour on the positioning member can be easily locally hardened. The provision of the pin-like end of the detent element is in turn also beneficial for realizing the most compact possible arresting device.

In order to advantageously provide an actuating arrangement with duplex redundancy for implementing the release position of the detent element, which actuating arrangement prevents the motor vehicle from being immobilized owing to a blocked parking lock in the event of a failure of the fluidic actuator of the arresting device, it is furthermore possible for the detent element to be movable, counter to the preload of the spring, into the release position also by means of an electromagnetic actuator with an armature which is displaceable along the feed axis.

In order, in the case of such a redundant embodiment of the arresting device, to nevertheless realize the smallest possible structural space requirement for the arresting device and thus for the parking lock module as a whole, it is preferable if the armature of the electromagnetic actuator and the pressurizable effective surface of the fluidic actuator are arranged coaxially with respect to the feed axis. It is thus also the case that an advantageously direct introduction of force for eliminating the arresting action between detent element and detent contour along only one axis is realized in a very compact structural form, be it by electromagnetic or hydraulic action.

It is basically possible for the electromagnetic actuator and the fluidic actuator to be arranged at one and the same axial height with respect to the feed axis. By contrast, an embodiment is however preferable in which the electromagnetic actuator and the fluidic actuator are arranged one behind the other on the feed axis. Owing to the thus better possible separation of the electrical and hydraulic components of the arresting device, these can advantageously each be of simpler form, with a smaller radial structural space requirement.

Here, it is particularly preferable if the fluidic actuator is, in relation to the positioning member, situated on the feed axis in front of the electromagnetic actuator. In principle, the electromagnetic actuator may duly also, in relation to the positioning member, be arranged on the feed axis in front of the fluidic actuator, though this embodiment would be associated with greater outlay and would take up more structural space.

In further pursuance of the concept of the invention, the spring for preloading the detent element may be integrated in the electromagnetic actuator of the arresting device, which in turn is advantageous in particular with regard to a small structural space requirement and an embodiment of the arresting device with the fewest possible components.

In a further preferred embodiment of the parking lock module, it is finally the case that the spring for preloading the detent element and the detent element are arranged coaxially with respect to the feed axis, which has the advantage in particular that no transverse forces act on the detent element owing to the spring force. Here, the spring for preloading the detent element can also advantageously be of small dimensions, because it is situated, with a centred introduction of force, on the axis of the feed movement. Also conceivable, however, is an embodiment with multiple springs which are distributed angularly about the feed axis with a radial spacing to the feed axis, though this would be associated with greater outlay.

BRIEF DESCRIPTION OF THE DRAWINGS

The invention will be discussed in more detail below on the basis of a preferred exemplary embodiment with reference to the appended, partially schematic drawings, in which.

Figure 1:
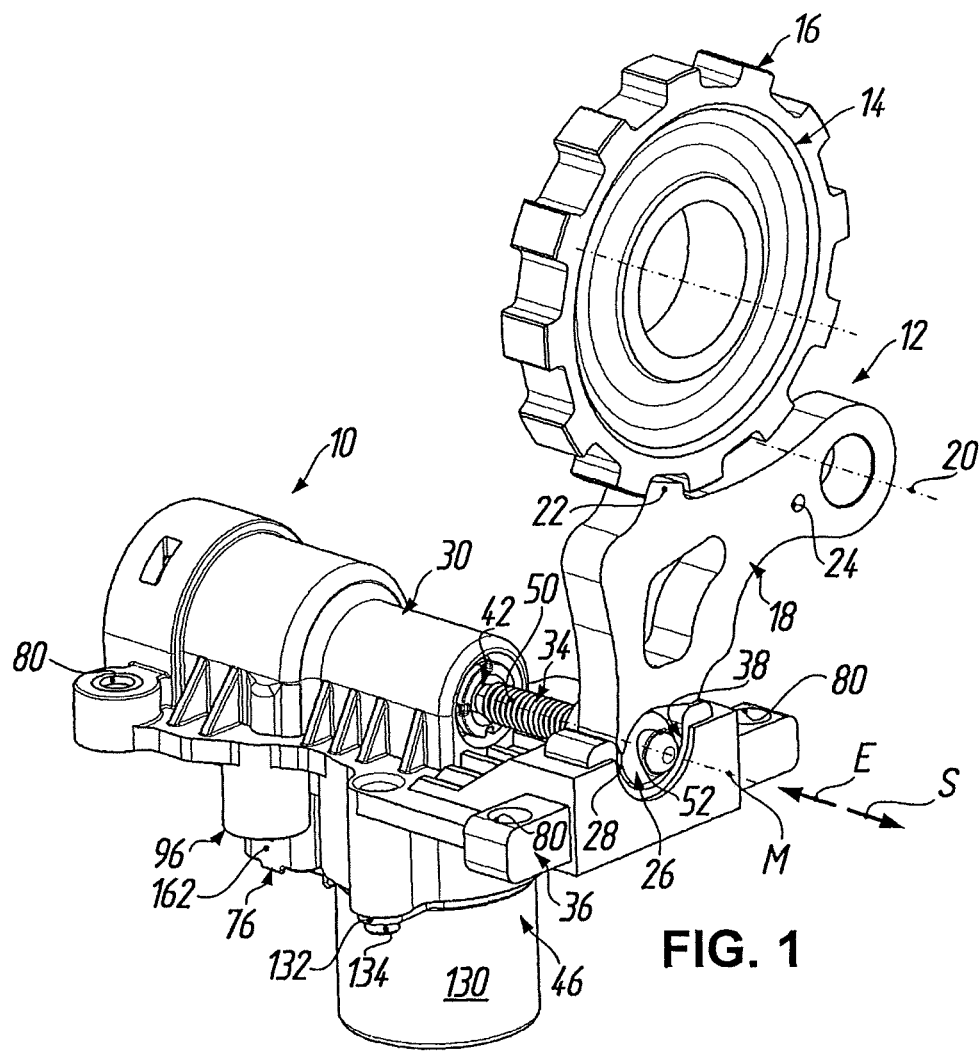
FIG. 1 shows a perspective view of a parking lock module according to the invention in its use position on a parking lock (only schematically shown here), with a pawl and a parking lock wheel, obliquely from above/front left.
Figure 2:
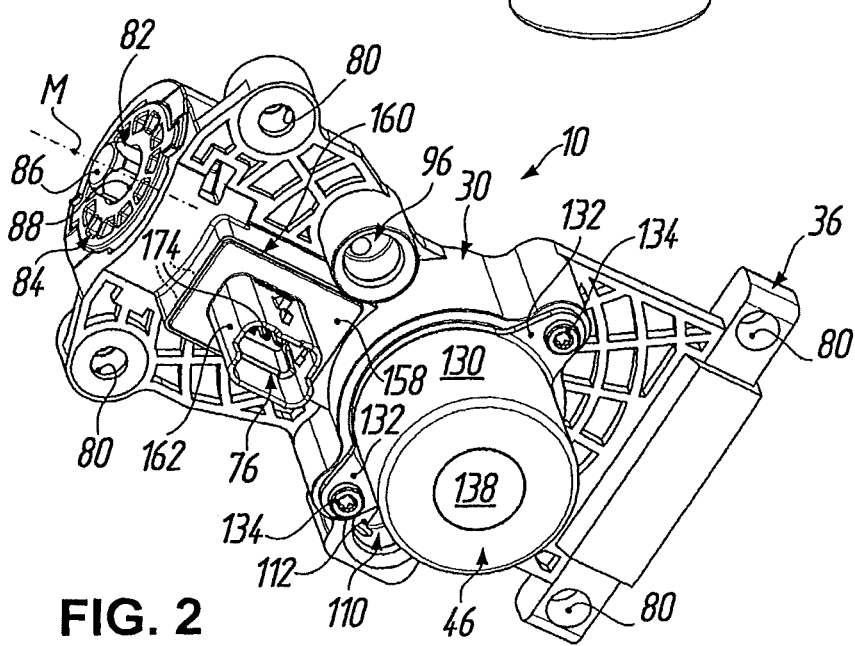
FIG. 2 shows a perspective view of the parking lock module as per FIG. 1 obliquely from below/rear left, without the elements of the parking lock.

In the drawings, elastic or elastomer components, specifically the dynamic seals, are shown in the non-deformed state in order to simplify the illustration; in reality, these deformable components bear against the adjacent surfaces of adjoining components.

DETAILED DESCRIPTION OF THE EXEMPLARY EMBODIMENT

Figure 3:
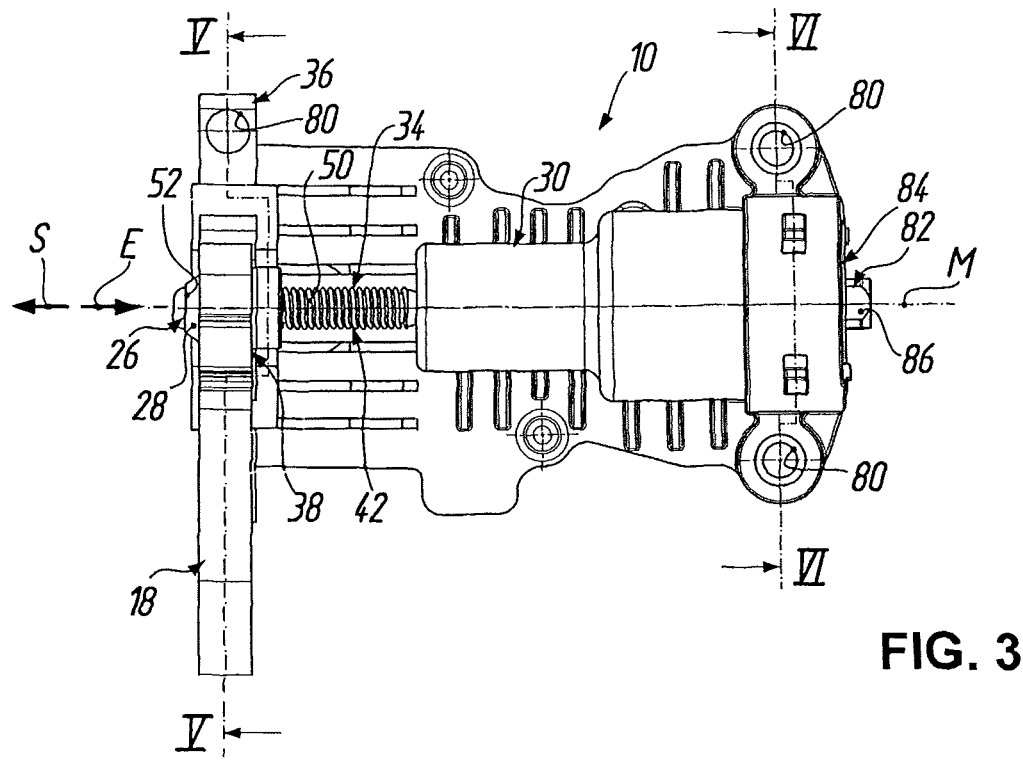
FIG. 3 shows a plan view of the parking lock module as per FIG. 1 from above in FIG. 1, with a pawl.
Figure 4:
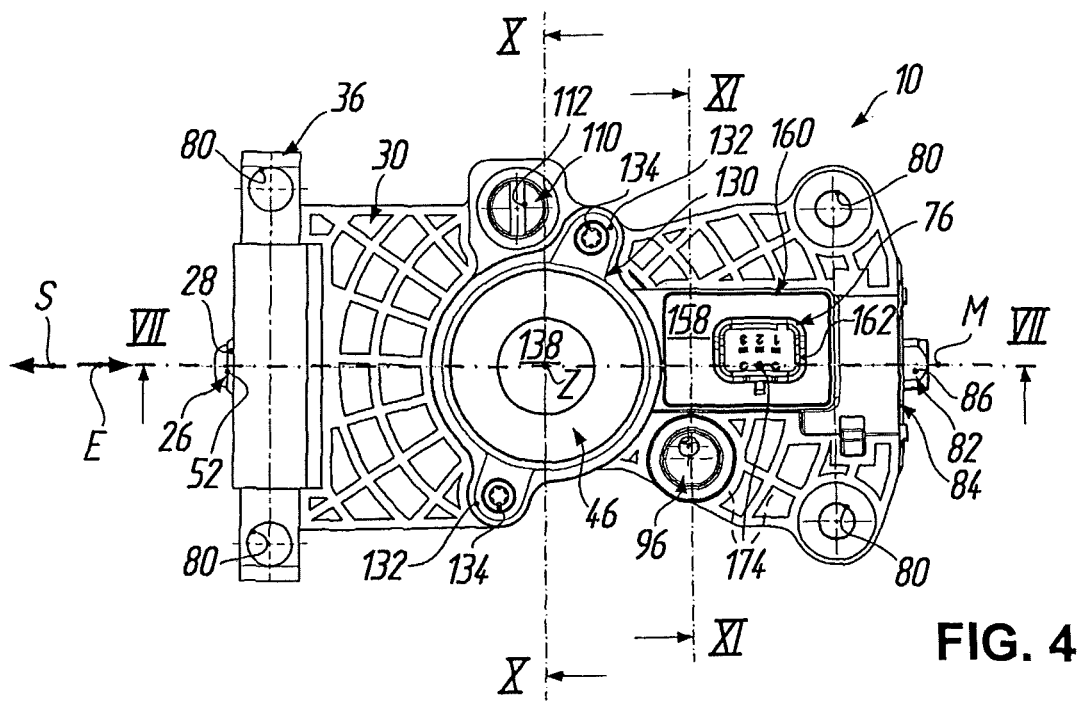
FIG. 4 shows a view from below of the parking lock module as per FIG. 1 from below in FIG. 1, again without the elements of the parking lock.
Figure 5:
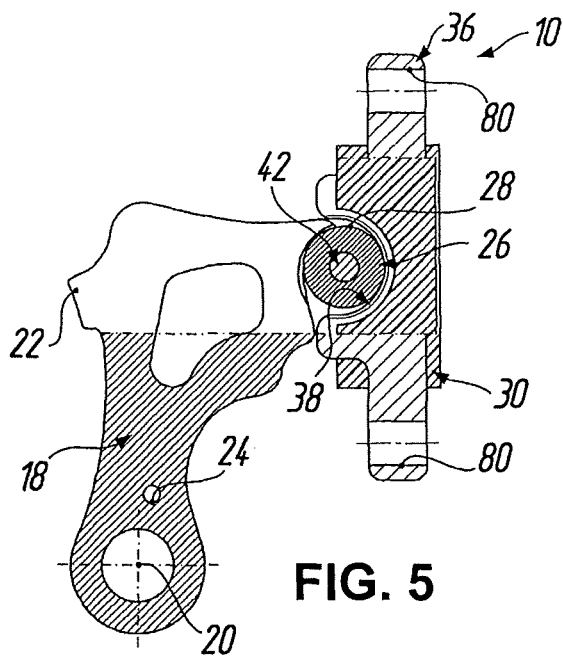
FIG. 5 shows a sectional view of the parking lock module as per FIG. 1 in accordance with the offset section profile line V-V in FIG. 3, likewise with a pawl.
Figure 6:
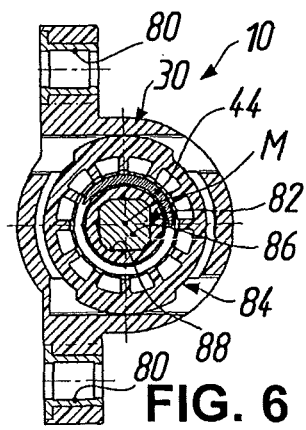
FIG. 6 shows a sectional view of the parking lock module as per FIG. 1 in accordance with the offset section profile line VI-VI in FIG. 3.

In the figures, the reference designation 10 is used generally to denote a parking lock module for actuating a parking lock 12 in a motor vehicle. As per FIG. 1, the parking lock 12 has, in a manner known per se, a parking lock wheel 14 which is arranged rotationally conjointly and axially fixedly on a transmission shaft (not illustrated) of a motor vehicle transmission and which has, on the outer circumference, a toothing 16. For the arresting of the drive train of the motor vehicle with form-fitting action, the parking lock 12 furthermore has a pawl 18 (shown only in FIGS. 1, 3 and 5) which is articulated on a transmission housing (not shown here) so as to be pivotable about a pivot axis 20. The pawl 18 has a locking tooth 22 which, during a pivoting of the pawl 18 about the pivot axis 20, can engage in form-fitting fashion with the toothing 16 of the parking lock wheel 14. The reference designation 24 indicates a bore in the pawl 18, which is engaged on by a restoring spring (not shown here) which is supported relative to the transmission housing and which preloads the pawl 18 away from the parking lock wheel 14 about the pivot axis 20 into an unlocked position.

Figure 7:
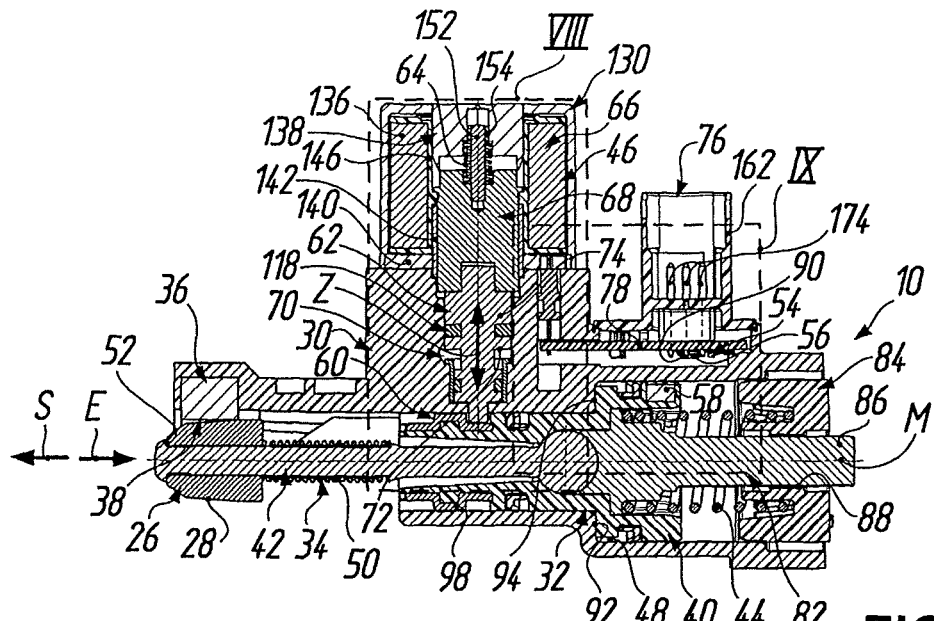
FIG. 7 shows a sectional view of the parking lock module as per FIG. 1 in accordance with the section profile line VII-VII in FIG. 4.

For the pivoting of the pawl 18 about the pivot axis 20, an actuating element 26 is provided on the parking lock module 10, which actuating element, in the exemplary embodiment illustrated, has a (doubly) conical surface portion 28 as per FIG. 7. The actuating element 26 is, in a manner yet to be described in more detail, axially displaceable selectively in a locking direction S or an unlocking direction E, as indicated by arrows in FIGS. 1, 3, 4 and 7 to 9, by means of an actuating mechanism 32 (see FIG. 7), which is accommodated in a housing 30 of the parking lock module 10, via an actuating member 34 which is articulatedly connected to the actuating mechanism 32. Here, the conical surface portion 28 of the actuating element 26 is, as per FIG. 1, supported on a conical guide element, which is fixed with respect to the housing, in the form of a metallic support plate 36, which for this purpose has a support portion 38.

Thus, during an axial movement of the actuating element 26 in the locking direction S, the pawl 18 in FIG. 1 is lifted, rotationally about the pivot axis 20, counter to the force of the restoring spring (not illustrated) in order to bring the locking tooth 22 into form-fitting engagement with the toothing 16 of the parking lock wheel 14. By contrast, in the event of an axial movement of the actuating element 26 in the unlocking direction E, the conical surface portion 28 of the actuating element 26 is pulled away out of its position between pawl 18 and support plate 36. This has the result that the pawl 18 in FIG. 1 is lowered, rotationally about the pivot axis 20, owing to the force of the restoring spring, wherein the locking tooth 22 disengages from the toothing 16 of the parking lock wheel 14.

In the exemplary embodiment illustrated, the housing 30 is—along with further parts of the parking lock module 10—formed from a plastics material, wherein the metallic support plate 36 is integrated in the housing 30 such that the support portion 38 of the support plate 36 for contact with the actuating element 26 projects beyond the plastics material of the housing 30 (see in particular FIGS. 1 and 5), as is described in detail in the earlier German patent application DE 10 2018 003 752.6 from the same applicant, to which reference is expressly made at this juncture with regard to further details in this respect.

With regard to further details of the actuating mechanism 32, reference is made firstly in particular to FIG. 7. According to said figure, the actuating mechanism 32 has a piston 40, which piston is received in the housing 30 of the parking lock module 10 so as to be longitudinally displaceable along a central axis M which forms a displacement axis, and which piston is operatively connected to a piston rod 42 of the actuating member 34. The piston 40 is, in the locking direction S, preloaded by means of a piston spring 44 with a spring force into a locking position (shown in FIGS. 7 to 9) in which said piston can be selectively fixed relative to the housing 30 by means of an arresting device 46 which will be discussed in more detail below. Furthermore, the piston 40 can be pressurized in the unlocking direction E, which is opposite to the locking direction S, via a pressure chamber 48 provided in the housing 30, in order, when the arresting device 46 is released, to assume an unlocking position counter to the spring force of the piston spring 44, in which unlocking position the piston 40 can in turn be fixed relative to the housing 30 by means of the arresting device 46. Accordingly, the piston 40 can be moved from the locking position into the unlocking position and vice versa, and fixed in the respective position, in a manner dependent on the state of actuation of the arresting device 46.

The actuating element 26 arranged axially displaceably on the piston rod 42 is furthermore, by means of a piston rod spring 50 (advancing spring), preloaded relative to the piston rod 42 in the locking direction S against a stop 52 provided on the piston rod 42. The piston rod spring 50 in the form of a helical compression spring serves as an energy store for the event that the pawl 18, during an actuation by the parking lock module 10, comes to bear with its locking tooth 22 against a tooth of the parking lock wheel 14 without engaging in form-fitting fashion with the toothing 16. In such a situation, the piston rod spring 50 ensures that the spring-preloaded actuating element 26 advances the pawl 18 as the motor vehicle rolls, such that the locking tooth 22 of said pawl 18 engages with the toothing 16 of the parking lock wheel 14. In the opposite direction, the actuating element 26 can, with a movement of the piston 40 in the unlocking position, be moved, that is to say pulled, by means of the stop 52 in the unlocking direction E.

The respective axial position of the piston 40 in the housing 30 can in this case be acquired by means of a sensor arrangement 54 (likewise described in yet more detail below) which, as per Figure is 7 and 9, generally has a position detector 56, which is positionally fixed relative to the housing 30, and a position encoder 58, which is operatively connected to the piston 40. By means of the sensor arrangement 54, it is thus possible firstly for the respective state of actuation of the parking lock module 10 to be acquired, that is to say whether the piston 40 of the actuating mechanism 32 is situated in the locking position as per FIG. 7 or in the unlocking position. Secondly, damage to the parking lock module 10, for example a possible breakage of the piston spring 44, can be detected. Furthermore, it is however also possible for the engagement and disengagement of the parking lock 12 to be controlled, specifically through acquisition of the stroke of the piston 40 and pressurization of the pressure chamber 48 in a manner dependent on this. It is likewise possible for "ratcheting" of the pawl 18 over the toothing 16 of the parking lock wheel 14 to be detected, which can be counteracted through pressurization of the pressure chamber 48.

Figure 10:
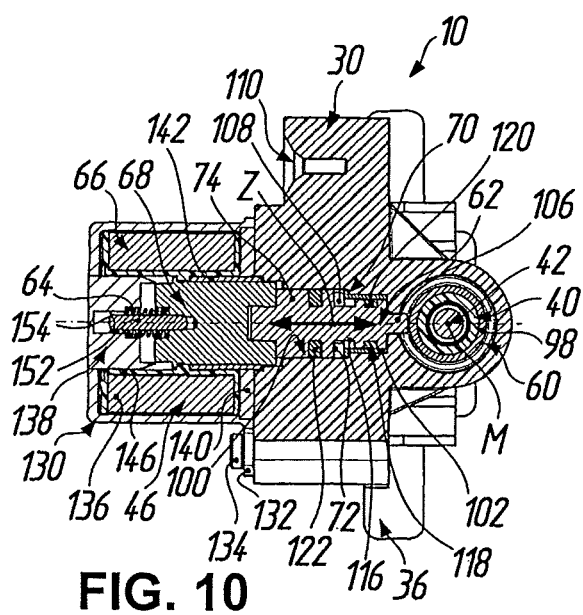
FIG. 10 shows a sectional view of the parking lock module as per FIG. 1 in accordance with the section profile line X-X in FIG. 4.
Figure 8:
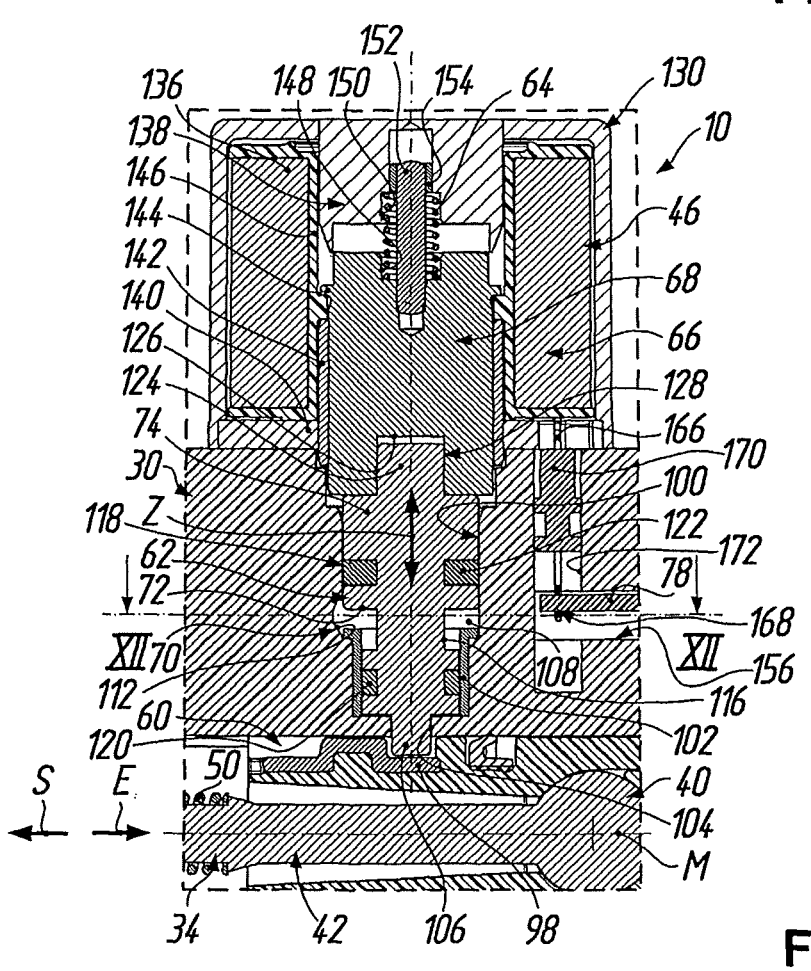
FIG. 8 shows a sectional view, cut away on all sides and on an enlarged scale, of the parking lock module as per FIG. 1 in accordance with the detail VIII in FIG. 7.

The arresting device 46 for the selective fixing of the piston 40 relative to the housing 30 generally comprises, as per in particular FIGS. 7, 8 and 10, a detent contour 60, which is fixed with respect to the positioning member, that is to say piston, and a detent element 62, which interacts with said detent contour and is provided on the housing. The detent contour 60 has detent portions for defining the locking position and the unlocking position of the piston 40. The detent element 62 is movable from an arresting position shown in the stated figures, in which said detent element is in engagement with the detent contour 60, into a release position, in which said detent element releases the detent contour 60, and vice versa. Here, the detent element 62 is passively preloaded into the arresting position by means of a spring 64. Counter to the preload of the spring 64, the detent element 62 can be actively moved into the release position by means of an electromagnetic actuator 66, which has an armature 68 which is displaceable along a feed axis Z, and/or by means of a fluidic actuator 70, which has a pressurizable effective surface 72. In the exemplary embodiment illustrated, the actuating arrangement for implementing the release position of the detent element 62 is thus formed with duplex redundancy.

Figure 11:
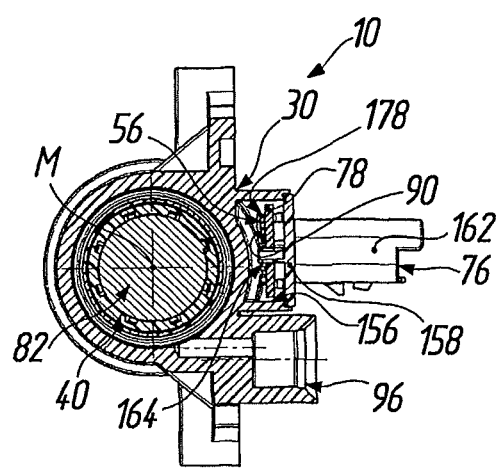
FIG. 11 shows a sectional view of the parking lock module as per FIG. 1 in accordance with the section profile line XI-XI in FIG. 4.

As will be discussed in detail below, the parking lock module 10 according to the embodiment illustrated has special features in relation to the prior art discussed in the introduction in particular with regard to the following five aspects (i to v): firstly, (i) the detent element 62 is guided displaceably along the feed axis Z, wherein, in a very compact embodiment of the parking lock module 10, the armature 68 of the electromagnetic actuator 66 and the pressurizable effective surface 72 of the fluidic actuator 70 are arranged coaxially with respect to the feed axis Z (see in particular FIG. 8). Furthermore, (ii) the spring 64 for preloading the detent element 62 is integrated in the electromagnetic actuator 66 of the arresting device 46 (see again FIGS. 7, 8 and 10), which is likewise beneficial for a small structural space requirement of the parking lock module 10. The same applies for the further special feature that (iii) the detent element 62 is itself formed as a piston 74, which is guided displaceably along the feed axis Z and which forms the pressurizable effective surface 72 of the fluidic actuator 70 (see in particular FIG. 8), wherein it is also the case that parts are omitted in relation to the prior art described further above. Furthermore, considering also the sensor system (sensor arrangement 54), provision is advantageously made whereby (iv) the electromagnetic actuator 66 of the arresting device 46 and the position detector 56 of the sensor arrangement 54 can be jointly contacted via an electrical interface 76 which is integrated in the parking lock module 10 (see in particular FIGS. 2, 4, 7 and 9), which, in relation to the prior art, considerably reduces the installation and contacting effort associated with the sensor system. Finally, this applies correspondingly to the special feature whereby (v) the electromagnetic actuator 66 of the arresting device 46 is activatable by means of a circuit board 78 attached to the housing 30 of the parking lock module 10, which circuit board also bears the position detector 56 of the sensor arrangement 54, as can be seen most clearly in FIGS. 9 and 11.

As regards the fastening of the parking lock module 10 in the motor vehicle, both the support plate 36 and the housing 30 are equipped with fastening holes 80, which are formed as parallel passage bores in the support plate 36 and as metallically lined passage holes in the housing 30, at locations of the support plate 36 and housing 30 which are spaced apart from one another to the greatest possible extent, as can be seen most clearly in FIGS. 2 to 6. In the installed state of the parking lock module 10, headed screws which are not illustrated in the figures extend through the fastening holes 80 and are screwed into associated threaded holes of the transmission housing (not shown) in order to position the parking lock module 10 relative to the transmission housing and pull said parking lock module firmly against the transmission housing.

The actuating mechanism 32 accommodated in the interior of the housing 30, and the attachment thereof to the actuating member 34, are described in detail in the earlier German patent application DE 10 2018 003 749.6 from the same applicant, to which reference is expressly made at this juncture with regard to further details in this respect. The parking lock module 10 according to the present exemplary embodiment has only few differences in relation thereto, as will be described briefly below.

One conspicuous difference in the case of the present exemplary embodiment consists firstly in that a thrust piece 82, via which the piston spring 44 engages on the piston 40 and which, by means of the piston spring 44, can be displaced relative to the piston 40 in the unlocking direction E counter to the spring force of the piston spring 44, is guided directly in a guide bushing 84 which closes off the housing 30 to the right in FIG. 7. Here, the guidance is realized with rotation prevention action by means of a guide extension 86 with a substantially square cross section (see FIG. 6), which engages through an opening 88 of complementary shape in the guide bushing 84.

Furthermore, a conspicuous difference in relation to the earlier design consists in that the position encoder 58 of the sensor arrangement 54 is, in the interior of the housing 30, attached directly to the positioning member, that is to say directly to the piston 40, which is in this case likewise formed as a plastics injection-moulded part. More specifically, it is also the case in the present exemplary embodiment that the sensor arrangement 54 is preferably a Hall sensor system, with a Hall element 90 as a constituent part of the position detector 56 (FIG. 9) fixed with respect to the housing, and with a magnet as position encoder 58, which is embedded in the piston 40 by encapsulation with the plastics material of the piston 40, that is to say is not seated outside the housing 30 and would not be connected by means of a holder to the piston 40.

As in the case of the previous design, the piston 40 is preloaded by means of the piston spring 44 against an annular stop surface 92 of the housing 30 in the locking position of the parking lock module 10 illustrated in FIG. 7. The counterpart surface 94 on the piston 40 is a constituent part of an annular effective surface which delimits the pressure chamber 48 and via which the piston 40 can be hydraulically acted on in the unlocking direction E. For the hydraulic loading of the pressure chamber 48 and thus of the piston 40, the housing 30 as per FIGS. 2, 4 and 11 has, on the underside, an integrally formed pressure port 96 which communicates with the pressure chamber 48 between housing 30 and piston 40 (see FIG. 11).

At the left-hand end in FIGS. 7 and 8, the piston 40 is reinforced on the outer circumference, for an engagement of the arresting device 46, with a metallic collar sleeve 98 which is embedded in the plastics material of the piston 40. The collar sleeve 98 forms, on the outer circumference, the detent contour 60 which, by means of the arresting device 46, permits locking of the piston 40 relative to the housing 30 either in the locking position or in the unlocking position of the piston 40.

In particular, FIGS. 7, 8, 10 and 12 now show further details of the arresting device 46 which, in the exemplary embodiment illustrated, as already mentioned further above, has two mutually independently activatable unlocking mechanisms, specifically the electrically activatable unlocking mechanism (electromagnetic actuator 66 with the armature 68 which is displaceable along the feed axis Z) and the hydraulically activatable unlocking mechanism (fluidic actuator 70 with the pressurizable effective surface 72). Both unlocking mechanisms serve for moving the detent element 62 counter to the spring force of the spring 64 selectively from its detent position on the collar sleeve 98 of the piston 40, as shown in FIGS. 7, 8 and 10, into a detent-release position remote from the collar sleeve 98, which permits a movement of the piston 40 along the central axis M.

For the spatial relative position of the individual constituent parts of the arresting device 46 with respect to the feed axis Z of the armature 68 of the electromagnetic actuator 66 and the piston 40 of the actuating mechanism 32 and the displacement axis thereof (central axis M) in the housing 30, the following can firstly be generally stated when considering in particular FIG. 8: the feed axis Z of the armature 68 extends substantially transversely with respect to the displacement axis M of the piston 40 and intersects said displacement axis (see FIG. 10). The fluidic actuator 70 and the electromagnetic actuator 66 are arranged one behind the other on the feed axis Z. Here, the fluidic actuator 70 is, in relation to the piston 40, situated on the feed axis Z in front of the electromagnetic actuator 66. Furthermore, the detent element 62 and the spring 64 for preloading the detent element 62 are arranged coaxially with respect to the feed axis Z, which likewise applies to the armature 68 of the electromagnetic actuator 66 and the spring 64. More specifically, the spring 64 and the armature 68 are arranged one behind the other on the feed axis Z. Here, in relation to the piston 40, the armature 68 is situated on the feed axis Z in front of the spring 64. The armature 68 is thus situated between the detent element 62 and the spring 64.

Figure 12:
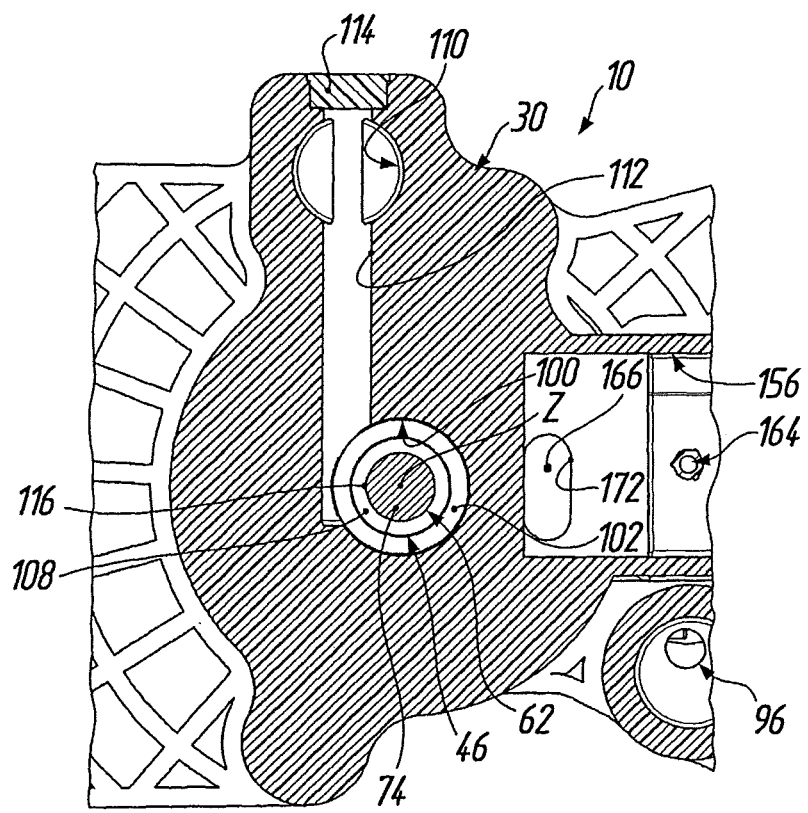
FIG. 12 shows a sectional view, cut away on all sides and on an enlarged scale, of the parking lock module as per FIG. 1 in accordance with the section profile line XII-XII in FIG. 8.

As shown in particular in FIG. 8, the housing 30 of the parking lock module 10 for accommodating the detent element 62, which, forming the pressurizable effective surface 72, is formed as a stepped piston 74 composed of metal, is equipped with a stepped cutout 100. The detent element 62 is guided in the cutout 100 of the housing 30, for which purpose a sub-region of the cutout 100 close to the piston 40 is lined with a metallic guide sleeve 102. The cutout 100 and the detent element 62 are in this case of rotationally symmetrical form about the feed axis Z, as can be seen in FIG. 12, in the same way as the guide sleeve 102. At the base of the cutout 100, the housing 30 is equipped with an aperture 104, which connects the cutout 100 to the interior of the housing 30, in which the piston 40 is accommodated in longitudinally displaceable fashion. The detent element 62 has a pin-like end 106 which can be placed in engagement with the detent contour 60 on the piston 40 and which, for this purpose, engages through the aperture 104, as illustrated in FIG. 8.

At the midpoint of the height of the cutout 100 in the housing 30, and thus at the height of the step of the piston 74, the detent element 62 and the cutout 100 delimit an annular pressure chamber 108, via which the effective surface 72 of the fluidic actuator 70 can be pressurized. For the hydraulic loading of the pressure chamber 108 and thus of the piston 74, the housing 30 in FIGS. 2 and 4 has, on the underside, a further pressure port 110 which is formed integrally on the housing 30 in a parallel arrangement with respect to the pressure port 96. The pressure port 110 communicates with the annular pressure space 108 via a connecting channel 112 which is formed in the housing 30 and which runs transversely with respect to the feed axis Z and with respect to the central axis M (see in particular FIGS. 4, 8 and 12). As can be seen most clearly in FIG. 12, the connecting channel 112, by means of its inner end, intersects the cutout 100 for receiving the detent element 62. At its other, outer end, the connecting channel 112 in FIG. 12 is closed off in sealed fashion with respect to the surroundings by means of a plastics plug 114, which is ultrasound-welded to the housing 30.

As per FIG. 8 in particular, for an improved impingement of flow on the hydraulic effective surface 72 of the piston 74, the detent element 62 is equipped, axially in the region of the annular pressure chamber 108, with a depression 116 which runs around the feed axis Z. FIGS. 8 and 10 furthermore show that the annular pressure chamber 108 is sealed off by means of a seal arrangement 118 between piston 74 and cutout 100. The seal arrangement 118 has, to both sides of the annular pressure chamber 108 as viewed along the feed axis Z, in each case one sealing element 120, 122. Here, the sealing elements 120, 122 are accommodated in respectively associated radial grooves of the piston 74, and protrude beyond these slightly in a radial direction in relation to the feed axis Z, in order to bear sealingly and in sliding fashion against the wall surface of the cutout 100, and simultaneously serve here as slide rings.

At its upper end in FIG. 8, the detent element 62 finally has a cylindrical extension 124, which is pressed into an end-side recess 126, which is of complementary shape, of the armature 68 of the electromagnetic actuator 66. Thus, the detent element 62 and the armature 68 are directly connected to one another, specifically by means of an interference fit at the reference designation 128 in FIG. 8.

It is clear to a person skilled in the art that, in the presence of sufficient hydraulic loading of the effective surface 72 of the piston 74 via the pressure port 110, the connecting channel 112 and the annular pressure chamber 108, the detent element 62 is lifted in the cutout 100 in FIG. 8, correspondingly to the double arrow Z, counter to the spring force of the spring 64 in the electromagnetic actuator 66. Here, the pin-like end 106 of the detent element 62 is retracted through the aperture 104 in the housing 30 and is released from the detent contour 60 on the collar sleeve 98 of the piston 40, such that the locking of the piston 40 is eliminated.

With regard to further details of the electromagnetic actuator 66, reference is made in particular to FIGS. 2, 4, 7, 8 and 10. Accordingly, the electromagnetic actuator 66 firstly has a substantially cup-shaped coil housing 130, which is flange-mounted from below on the housing 30 of the parking lock module 10. For this purpose, the coil housing 130 has in each case one flange lug 132 situated on diametrically opposite sides with respect to its central axis (feed axis Z). When the electromagnetic actuator 66 is in the fastening state on the housing 30 of the parking lock module 10, fastening screws 134 engage through the flange lugs 132 of the coil housing 130 and are screwed into threaded bushings (not shown in the figures) which are embedded in the plastics material of the housing 30.

In the coil housing 130, there is accommodated a coil 136, such as is known for solenoids, which interacts with the armature 68 and which surrounds the armature 68. The coil 136 is held in the coil housing 130 by means of a closure part 138 situated at the top in FIGS. 7 and 8 and an annular return-path plate 140 situated at the bottom in said figures. The closure part 138 and the return-path plate 140 are pressed into the coil housing 130 and ensure the required magnetic return path of the magnetic drive that is formed. Furthermore, a bushing 142 is pressed into the return-path plate 140, which bushing guides the substantially cylindrical armature 68. The bushing 142 protrudes slightly beyond the return-path plate 140, such that it can engage with centring action in the stepped cutout 100 of the housing 30, as shown in FIG. 8. An annular collar 144 formed close to the upper end of the armature 68 in FIG. 8 forms, with a counterpart surface on a plastics encapsulation 146 of the coil 136, a captive retention means for the armature 68 in a state in which the electromagnetic actuator 66 has not yet been installed on the housing 30 of the parking lock module 10.

It can also be seen in FIGS. 7, 8 and 10 that the spring 64 for preloading the detent element 62 engages on the armature 68 and, here, is supported on the closure part 138 of the coil housing 130. More specifically, in FIG. 8 in particular, the armature 68 and the closure part 138 are equipped with mutually oppositely situated stepped bores 148, 150, which serve for accommodating the mutually averted ends of the spring 64. The spring 64 is a helical compression spring, which is guided in the electromagnetic actuator 66 by means of a cylindrical guide pin 152. Here, the guide pin 152 is suitably fixed, for example by being pressed in, in that bore portion of the stepped bore 148 of the armature 68 which is of relatively small diameter. On the opposite side, the guide pin 152 is guided by means of a guide bushing 154 in that bore portion of the stepped bore 150 of the closure part 138 which is of relatively small diameter. The guide bushing 154 itself is pressed into the stepped bore 150 of the closure part 138.

It is again evident to a person skilled in the art that the detent element 62 which is fixedly connected to the armature 68 of the electromagnetic actuator 66 can, through suitable electrical energization of the electromagnetic actuator 66, more specifically of its coil 136, be lifted counter to the force of the spring 64 that is accommodated in the coil housing 130, such that the pin-like end 106 of the detent element 62 is released from the collar sleeve 98 of the piston 40 in the housing 30. The piston 40, released from the arresting device 46 by electromagnetic and/or hydraulic action, of the parking lock module 10 can then, in a manner dependent on the state of actuation of the parking lock 12, be moved from its unlocking position into its locking position by the spring force of the piston spring 44 or from its locking position into its unlocking position by hydraulic loading of the pressure chamber 48 in the housing 30, before said piston is fixed again in its respective position by means of the arresting device 46. For a defined detent position of the detent element 62 of the arresting device 46 in the housing 30, the base, provided with the aperture 104, of the cutout 100 in the housing 30 furthermore forms a stop for the detent element 62.

Figure 9:
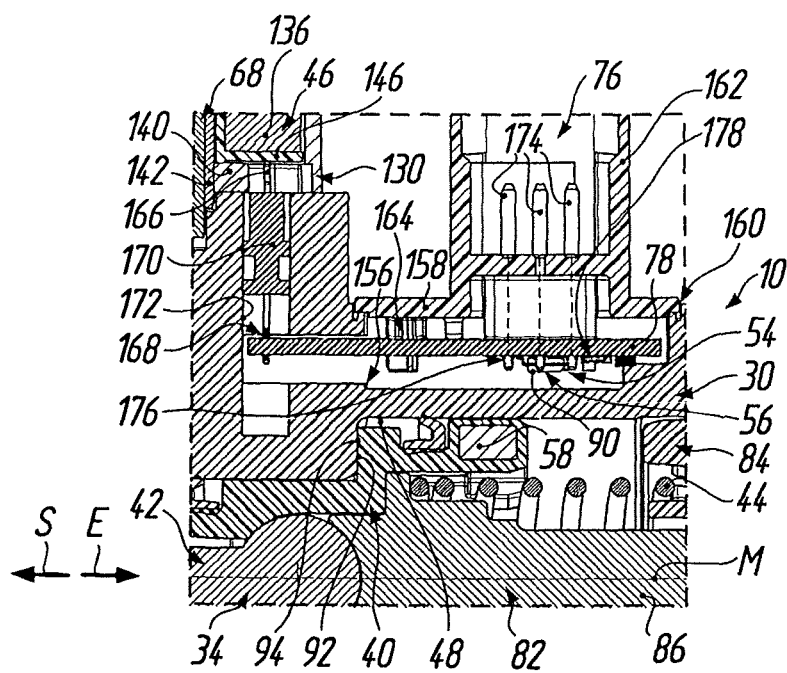
FIG. 9 shows a sectional view, cut away on all sides and on an enlarged scale, of the parking lock module as per FIG. 1 in accordance with the detail IX in FIG. 7.

With regard to further details of the electrical contacting of the electromagnetic actuator 66 of the arresting device 46 and of the position detector 56 of the sensor arrangement 54 with the aid of the common electrical interface 76 and the circuit board 78, reference is made in particular to FIGS. 7 to 9.

Accordingly, the housing 30 of the parking lock module 10 is equipped with a cutout 156 for tightly receiving the circuit board 78, which is rectangular as seen in plan view. The cutout 156 for receiving the circuit board 78 extends, in its main direction of extent, longitudinally with respect to the piston 40, that is to say along the central axis M of the housing 30. Here, the circuit board 78 accommodated in the cutout 156 is oriented transversely with respect to the feed axis Z of the armature 68 of the electromagnetic actuator 66. Outwardly, the cutout 156 for receiving the circuit board 78 is closed off by means of a cover 158. The cover 158, which is likewise composed of a plastics material, is sealingly laser-welded in encircling fashion to the housing 30 of the parking lock module 10 at the reference designation 160 in FIGS. 2, 4 and 9.

As per in particular FIGS. 2, 4, 7, 9 and 11, the common electrical interface 76 for the electromagnetic actuator 66 of the arresting device 46 and the position detector 56 of the sensor arrangement 54 furthermore has a plug connector 162 attached to the housing 30 of the parking lock module 10. The plug connector 162 is oriented substantially transversely with respect to the central axis M of the piston 40, along which the piston 40 is longitudinally displaceable in the housing 30 of the parking lock module 10. In the exemplary embodiment illustrated, the plug connector 162 is formed on the cover 158 for the cutout 156 for receiving the circuit board 78, more specifically is formed integrally with the cover 158. Furthermore, the circuit board 78 is, at the reference designation 164 in FIGS. 9 and 11, fastened in a suitable manner to the cover 158 of the housing 30, for example by means of a mechanical clip connection or hot calking of fastening projections on the cover 158 which is composed of plastic.

Both the electromagnetic actuator 66 of the arresting device 46 and the position detector 56 of the sensor arrangement 54 are connected to the electrical interface 76 via the circuit board 78 which is attached to the housing 30. Here, the electromagnetic actuator 66 of the arresting device 46, more specifically the coil 136 thereof, is contacted with the circuit board 78 via contact pins 166 (to simplify the illustration, only one contact pin 166 is shown in the figures). The contact pins 166 are fixed in the circuit board 78 by means of a press-fit connection at the reference designation 168 in FIGS. 8 and 9. For mechanical stabilization, the contact pins 166 of the electromagnetic actuator 66 are held by means of a guide part 170 in a slot 172 of the housing 30 of the parking lock module 10, which slot runs transversely with respect to the cutout 156 for receiving the circuit board 78.

As is furthermore indicated in FIGS. 7 and 9, the plug connector 162 for the joint contacting of the electromagnetic actuator 66 of the arresting device 46 and of the position detector 56 of the sensor arrangement 54 is equipped with contact pins 174, which are likewise fixed in the circuit board 78 by means of a press-fit connection 176 (FIG. 9). It is finally also shown in FIG. 9 that, in the parking lock module 10, there are also integrated activation electronics 178, known per se, for the Hall element 90 of the position detector 56, said control electronics being arranged and interconnected on the circuit board 78. For the sensor arrangement 54, the circuit board 78 thus not only serves as a mechanical support of the position detector 56 but simultaneously also serves for the interconnection of the Hall element 90 of the position detector 56 with the associated activation electronics 178.

For a person skilled in the art, it is evident that the Hall element 90, arranged on that side of the circuit board 78 which faces towards the piston 40, of the position detector 56 is capable of detecting the position of the position encoder 58 (magnet), which is embedded in the piston 40, through the wall of the plastics housing 30, such that the respective actuation state of the parking lock module 10 can be acquired by means of the sensor arrangement 54. When the parking lock module 10 is installed in the motor vehicle, the technician merely has to join a plug (not shown) to the plug connector 162 in order to produce the electrical contact both with the electromagnetic actuator 66 of the arresting device 46 and with the position detector 56 of the sensor arrangement 54, that is to say to ensure a complete electrical connection of the parking lock module 10 in the motor vehicle.

A parking lock module has a housing, in which, for the actuation of a parking lock, a positioning member is accommodated in longitudinally displaceable fashion, which positioning member is movable from a locking position into an unlocking position and vice versa. The positioning member is selectively fixable relative to the housing by means of an arresting device, which arresting device has a detent contour fixed to the positioning member and has a detent element on the housing. The detent element is movable from an arresting position, in which it is in engagement with the detent contour, into a release position, in which it releases the detent contour, and vice versa. Here, the detent element is passively preloaded into the arresting position by means of a spring and is actively movable, counter to the spring, into the release position by means of at least one fluidic actuator with a pressurizable effective surface. In a very compact embodiment, the detent element itself is formed as a piston which is guided displaceably along a feed axis and which forms the pressurizable effective surface of the fluidic actuator.

LIST OF REFERENCE DESIGNATIONS

10 Parking lock module
12 Parking lock
14 Parking lock wheel
16 Toothing
18 Pawl
20 Pivot axis
22 Locking tooth
24 Bore
26 Actuating element
28 Conical surface portion
30 Housing
32 Actuating mechanism
34 Actuating member
36 Metallic support plate
38 Support portion
40 Positioning member/piston
42 Piston rod
44 Piston spring
46 Arresting device
48 Pressure chamber
50 Piston rod spring
52 Stop
54 Sensor arrangement
56 Position detector
58 Position encoder
60 Detent contour
62 Detent element
64 Spring
66 Electromagnetic actuator
68 Armature
70 Fluidic actuator
72 Pressurizable effective surface
74 Piston
76 Electrical interface
78 Circuit board
80 Fastening hole
82 Thrust piece
84 Guide bushing
86 Guide extension
88 Opening
90 Hall element
92 Stop surface
94 Counterpart surface
96 Pressure port
98 Collar sleeve
100 Cutout
102 Guide sleeve
104 Aperture
106 Pin-like end
108 Annular pressure space
110 Pressure port
112 Connecting channel
114 Plastics plug
116 Depression
118 Seal arrangement
120 Sealing element
122 Sealing element
124 Cylindrical extension
126 Recess
128 Interference fit
130 Coil housing
132 Flange lug
134 Fastening screw
136 Coil
138 Closure part
140 Return-path plate
142 Bushing
144 Annular collar
146 Plastics encapsulation
148 Stepped bore
150 Stepped bore
152 Guide pin
154 Guide bushing
156 Cutout 158 Cover
160 Laser-welded connection
162 Plug connector
164 Circuit board fastening
166 Contact pin
168 Interference-fit connection
170 Guide part
172 Slot
174 Contact pin
176 Interference-fit connection
178 Activation electronics
E Unlocking direction
M Central axis/displacement axis
S Locking direction
Z Feed axis

The invention claimed is:

1. A parking lock module for actuating a parking lock in a motor vehicle, having a housing, wherein a positioning member for the actuation of the parking lock is accommodated in longitudinally displaceable fashion, said positioning member is movable from a locking position into an unlocking position and vice versa and is selectively fixable relative to the housing with an arresting device, said arresting device has a detent contour fixed to the positioning member and has a detent element on the housing, which detent element is movable from an arresting position, wherein said detent element is in engagement with the detent contour, into a release position, wherein said detent element releases the detent contour, and vice versa, wherein the detent element is preloaded into the arresting position with a spring and is movable, counter to the preload of the spring, into the release position with at least one fluidic actuator with a pressurizable effective surface, wherein the detent element is formed as a piston which is guided displaceably along a feed axis and which forms the pressurizable effective surface of the fluidic actuator,
  wherein the detent element is movable, counter to the preload of the spring, into the release position also by means of an electromagnetic actuator with an armature which is displaceable along the feed axis; and
  wherein the electromagnetic actuator and the fluidic actuator are arranged one behind the other on the feed axis.

2. The parking lock module according to claim 1, wherein said feed axis extends substantially transversely with respect to a displacement axis of the positioning member, along which the positioning member is longitudinally displaceable in the housing of the parking lock module.

3. The parking lock module according to claim 1, wherein said detent element is guided in a cutout of the housing of the parking lock module.

4. The parking lock module according to claim 3, wherein said detent element is guided with the aid of a guide sleeve in the cutout of the housing.

5. The parking lock module according to claim 3, wherein said detent element and the cutout of the housing are of rotationally symmetrical form about the feed axis.

6. The parking lock module according to claim 3, wherein said detent element, which is designed as a stepped piston, and the cutout of the housing delimit an annular pressure chamber via which the effective surface of the fluidic actuator is pressurizable.

7. The parking lock module according to claim 6, wherein said detent element is equipped, axially in the region of the annular pressure chamber, with a depression which runs around the feed axis.

8. The parking lock module according to claim 6, wherein said annular pressure chamber is sealed off with a seal arrangement which, as viewed along the feed axis, has in each case one sealing element to both sides of the annular pressure chamber.

9. The parking lock module according to claim 1, wherein said detent element has a pin-like end which can be placed in engagement with the detent contour.

10. The parking lock module according to claim 1, wherein said armature of the electromagnetic actuator and the pressurizable effective surface of the fluidic actuator are arranged coaxially with respect to the feed axis.

11. The parking lock module according to claim 1, wherein said spring for preloading the detent element and the detent element are arranged coaxially with respect to the feed axis.

12. A parking lock module for actuating a parking lock in a motor vehicle, having a housing, wherein a positioning member for the actuation of the parking lock is accommodated in longitudinally displaceable fashion, said positioning member is movable from a locking position into an unlocking position and vice versa and is selectively fixable relative to the housing with an arresting device, said arresting device has a detent contour fixed to the positioning member and has a detent element on the housing, which detent element is movable from an arresting position, wherein said detent element is in engagement with the detent contour, into a release position, wherein said detent element releases the detent contour, and vice versa, wherein the detent element is preloaded into the arresting position with a spring and is movable, counter to the preload of the spring, into the release position with at least one fluidic actuator with a pressurizable effective surface, wherein the detent element is formed as a piston which is guided displaceably along a feed axis and which forms the pressurizable effective surface of the fluidic actuator,
  wherein the detent element is movable, counter to the preload of the spring, into the release position also by means of an electromagnetic actuator with an armature which is displaceable along the feed axis; and
  wherein said fluidic actuator is, in relation to the positioning member, situated on the feed axis in front of the electromagnetic actuator.

13. The parking lock module for actuating a parking lock in a motor vehicle, having a housing, wherein a positioning member for the actuation of the parking lock is accommodated in longitudinally displaceable fashion, said positioning member is movable from a locking position into an unlocking position and vice versa and is selectively fixable relative to the housing with an arresting device, said arresting device has a detent contour fixed to the positioning member and has a detent element on the housing, which detent element is movable from an arresting position, wherein said detent element is in engagement with the detent contour, into a release position. wherein said detent element releases the detent contour. and vice versa, wherein the detent element is preloaded into the arresting position with a spring and is movable, counter to the preload of the spring, into the release position with at least one fluidic actuator with a pressurizable effective surface. wherein the detent element is formed as a piston which is guided displaceably along a feed axis and which forms the pressurizable effective surface of the fluidic actuator,
  wherein the detent element is movable, counter to the preload of the spring, into the release position also by means of an electromagnetic actuator with an armature which is displaceable along the feed axis; and wherein said spring for preloading the detent element is integrated in the electromagnetic actuator of the arresting device.

* * * * *